United States Patent
Izuhara et al.

(10) Patent No.: US 9,160,014 B2
(45) Date of Patent: Oct. 13, 2015

(54) FUEL CELL SYSTEM CAPABLE OF PERFORMING GAS PURGE TO ADJUST AMOUNT OF WATER THEREIN

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hideshi Izuhara, Kasugai (JP); Yuichi Sakajo, Toyohashi (JP); Tooru Tanaka, Obu (JP); Keigo Suematsu, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 13/749,056

(22) Filed: Jan. 24, 2013

(65) Prior Publication Data
US 2013/0189595 A1    Jul. 25, 2013

(30) Foreign Application Priority Data
Jan. 24, 2012   (JP) .................................. 2012-012338

(51) Int. Cl.
H01M 8/04       (2006.01)
(52) U.S. Cl.
CPC ...... *H01M 8/04119* (2013.01); *H01M 8/04179* (2013.01); *H01M 8/04641* (2013.01); *H01M 8/04955* (2013.01); *Y02E 60/50* (2013.01)
(58) Field of Classification Search
None
See application file for complete search history.

(56) References Cited

U.S. PATENT DOCUMENTS

| | | | |
|---|---|---|---|
| 2005/0170228 A1* | 8/2005 | Tajiri et al. | 429/30 |
| 2006/0115699 A1 | 6/2006 | Matsuoka | |
| 2009/0226770 A1* | 9/2009 | Manabe et al. | 429/13 |
| 2010/0013490 A1* | 1/2010 | Manabe et al. | 324/430 |
| 2010/0015482 A1* | 1/2010 | Kajiwara | 429/22 |
| 2010/0081022 A1 | 4/2010 | Imamura et al. | |
| 2010/0291446 A1 | 11/2010 | Aso et al. | |
| 2011/0269046 A1 | 11/2011 | Suematsu | |
| 2012/0015263 A1* | 1/2012 | Suematsu et al. | 429/414 |

FOREIGN PATENT DOCUMENTS

| | | |
|---|---|---|
| JP | 2004-199988 A | 7/2004 |
| JP | 2008-103257 A | 5/2008 |
| JP | 2008-108434 | 5/2008 |

(Continued)

OTHER PUBLICATIONS

Japanese Office Action issued in Application No. 2012-012338 dated Jan. 27, 2015 (w/ translation).

*Primary Examiner* — Patrick Ryan
*Assistant Examiner* — Haixia Zhang
(74) *Attorney, Agent, or Firm* — Nixon & Vanderhye P.C.

(57) ABSTRACT

A fuel cell system includes: a fuel cell having laminated cells; a measuring unit that measures an impedance of the cell and a purging unit that performs purging to discharge residual water from a gas passage. The cell includes a wet region and a dry region which are set depending on a distribution of water in the cell when the purging is executed so as to set a total amount of water in the fuel cell to be a necessary amount of water to start up the fuel cell; the measuring unit measures the impedance at a local portion located at a boundary portion between the wet region and the dry region in the cell; and the purging unit terminates the purging when the impedance measured by the measuring means is larger than a predetermined reference threshold value.

11 Claims, 7 Drawing Sheets

(56) References Cited

FOREIGN PATENT DOCUMENTS

| | | |
|---|---|---|
| JP | 2008-282658 | 11/2008 |
| JP | 2008-293713 | 12/2008 |
| JP | 2009-004299 | 1/2009 |
| JP | 2009-135066 | 6/2009 |
| JP | 2010-165463 A | 7/2010 |
| JP | 2011-233243 | 11/2011 |

* cited by examiner

A-ARROW VIEW

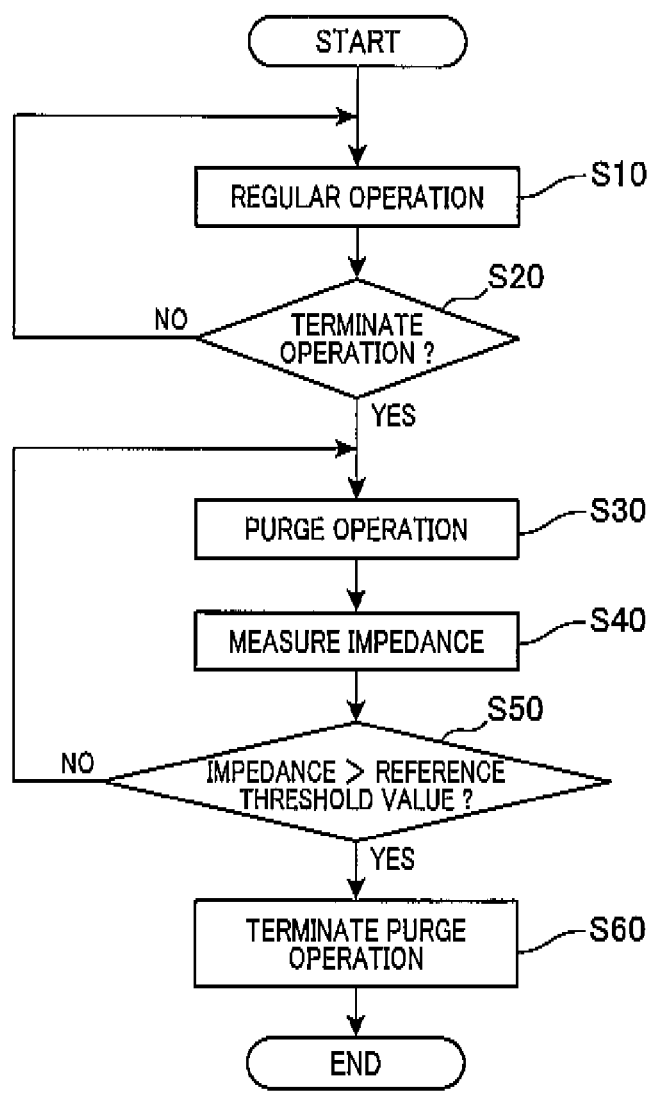

FUEL CELL SYSTEM CAPABLE OF PERFORMING GAS PURGE TO ADJUST AMOUNT OF WATER THEREIN

CROSS REFERENCE TO RELATED APPLICATION

This application is based on and claims the benefit of priority from earlier Japanese Patent Application No. 2012-12338 filed on Jan. 24, 2012 the description of which is incorporated herein by reference.

BACKGROUND

1. Technical Field

The present disclosure relates to a fuel cell system provided with a fuel cell capable of generating an electric energy by electrochemical reaction between hydrogen and oxygen.

2. Description of the Related Art

Conventionally, a fuel cell system in which a gas purge is performed when the operation of the fuel cell is stopped is known. For example, Japanese Patent Application Laid-Open Publication No. 2008-282658 discloses a fuel cell system in which a gas purge is performed when the operation of the fuel cell is stopped such that a purge gas is supplied internally so as to eliminate residual water remained in the fuel cell.

Regarding the fuel cell, when a large amount of residual water remains in the fuel cell, it may cause degradation of a start-up process of the fuel cell when the fuel cell starts at the subsequent start cycle, or cause plumbing breakage due to residual frozen water in the fuel cell. Meanwhile, when the fuel cell lacks water in the fuel cell itself, an efficiency of the power generation may be decreased.

In this respect, in the fuel cell system according to the above-described patent document, since there is a correlation between the amount of residual water in the fuel cell and the impedance thereof, an execution time for the gas purge processing is adjusted in response to a change in the impedance of the fuel cell. Specifically, a target impedance value corresponding to most appropriate amount of water to maintain the fuel cell is set in advance. Then, the gas purge processing is started and when the impedance value reaches a target value, the gas purge processing is terminated.

However, in the fuel cell system according to the above-described patent document, the impedance of the fuel cell system (impedance of entire fuel cell system) is measured by using the output voltage and the output current of the entire fuel cell system. Therefore, it is difficult to perform the gas purge processing to control an amount of water in the fuel cell accurately.

Specifically, when the air as a purge gas is supplied to the fuel cell system in order to perform the gas purge processing, it lacks of water at an input portion of the air in the respective fuel cells. Meanwhile, residual water at the input portion of the air flows towards the downstream side of the fuel cell because of flowing purge gas. As a result, excessive water tends to remain at the output portion of the air in the respective fuel cells. In this case, since the impedance value of the entire fuel cell system is calculated as a total resistance value which is sum of a resistance at the input portion of the respective fuel cells and a resistance at the output portion of the respective fuel cells, the correlation between the amount of residual water and the impedance of the fuel cell is not satisfied (i.e., variance of correlation). In other word, when the gas purge processing is executed, even when the total impedance value of the fuel cell system is matched with a predetermined impedance value set in advance that corresponds to an ideal amount of water remaining in the fuel cell, the actual amount of water may greatly differ from the ideal amount of water.

SUMMARY

The embodiment provides a fuel cell system capable of performing a gas purge so as to allow the fuel cell to have an appropriate amount of water therein.

As a first aspect of the embodiment, a fuel cell system includes: a fuel cell including a plurality of cells being laminated in a laminate direction of the fuel cell, each of the cells producing electrical energy by an electrochemical reaction with a reactant gas; signal applying unit for applying an AC signal having a predetermined frequency to the fuel cell; measuring means for measuring an impedance of the cell when the signal applying unit applies the AC signal to the fuel cell; supplying means for supplying a purge gas to a gas passage where the reactant gas flows; and purging means for purging the gas passage so as to discharge water present in the gas passage when an operation of the fuel cell is stopped, the purging being executed by controlling the supplying means based on the impedance of the cell measured by the measuring means. Moreover, the cell includes a wet region and a dry region which are set depending on a distribution of an amount of water in the cell when the purging is executed so as to set a total amount of water in the fuel cell to be a necessary amount of water to start up the fuel cell; the measuring means is configured to measure the impedance at a local portion located at a boundary portion between the wet region and the dry region in the cell; and the purging means is configured to terminate the purging when the impedance measured by the measuring means is larger than a predetermined reference threshold value.

According to the first aspect of the embodiment, since the impedance is measured at the local portion of the cell, a variance of correlation between the measured impedance and an amount of water at the local portion in the cell can be suppressed. Hence, a state of the local portion can be appropriately recognized by the fuel cell system.

Moreover, when the local portion located at a boundary portion between a wet region and a dry portion in the cell is dried and the impedance at the local portion increases, the gas purge processing is terminated. Therefore, the total amount of water of the respective cells when the gas purge processing is terminated can be adjusted to a necessary amount of water in the cell to start up the fuel cell.

Accordingly, the fuel cell system of the present disclosure can execute gas purge processing so as to allow the cell that composes the fuel cell to have most appropriate amount of water.

As a second aspect of the embodiment, the cell includes an electrolyte membrane and a membrane electrode assembly in which a pair of electrodes and are disposed at both sides of the electrolyte membrane. The wet region and the dry region are set depending on a distribution of an amount of water in the membrane electrode assembly when the purging is executed so as to set a total amount of water in the fuel cell to be necessary amount of water to start up the fuel cell.

Thus, the wet region and the dry region are set depending on a distribution of an amount of water not only in the electrolyte membrane but also in the pair of electrodes, whereby a variance of correlation between the total amount of water at the respective cells when the gas purge processing is terminated and necessary amount of water for the respective cells to start up the fuel cell can be suppressed.

As a third aspect of the embodiment, the purging means is configured to set the reference threshold value such that the lower the temperature of the fuel cell, the larger the reference threshold value.

According to this configuration, since the reference threshold value is set based on an increase of the impedance due to decreasing temperature of the fuel cell, the gas purge processing can be terminated at more appropriate timing.

As a fourth aspect of the embodiment, the measuring means is configured to measure the impedance such that among the plurality of the cell, an impedance of at least the cell located at an end portion side of the laminate direction and the cell located at a location other than the end portion side of the laminate direction are measured.

Thus, when the measuring means is configured to measure the impedance of cells having difference temperature range in the fuel cell, a variance between the total amount of water of the fuel cell when the gas purge is executed and necessary amount of water for entire fuel cell to start up the fuel cell can be suppressed.

As a fifth aspect of the embodiment, signal applying unit is capable of applying a low frequency AC signal which is lower than or equal to a predetermined reference frequency, and the measuring means is configured to measure the impedance of the cell when the signal applying means applies the low frequency AC signal to the fuel cell.

According to the fifth aspect of the embodiment, a change in the impedance of the cell can be measured faster than that of the conventionally-used fuel cell systems whereby the gas purge processing can be terminated at appropriate timing.

BRIEF DESCRIPTION OF THE DRAWINGS

In the accompanying drawings:

FIG. 7 is a flowchart showing a control routine executed by a control unit according to the first embodiment;

DETAILED DESCRIPTION OF THE PREFERRED EMBODIMENTS

Figure 1:
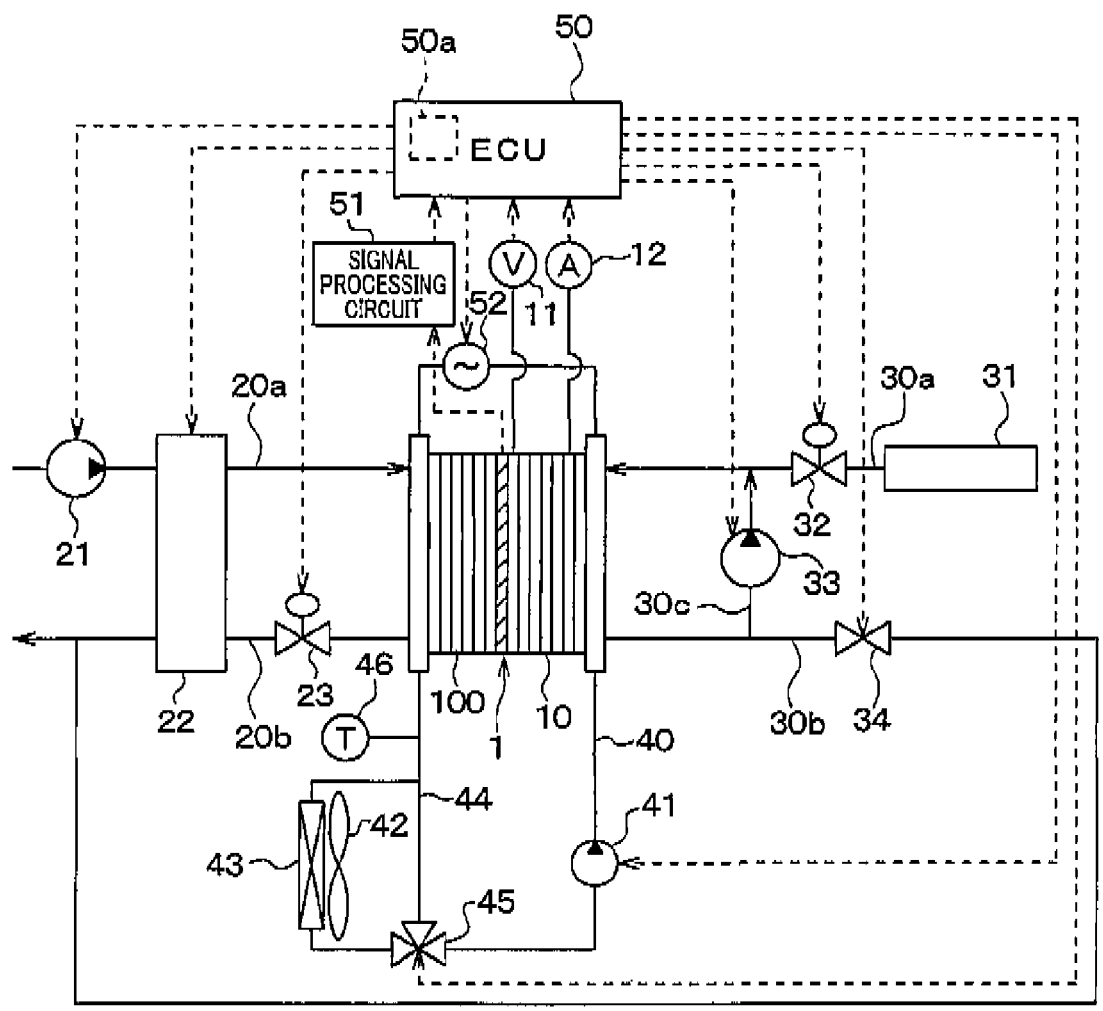
FIG. 1 is an overall block diagram showing a fuel cell system according to the first embodiment.

With reference to the drawings, hereinafter will be described an embodiments according to the present disclosure. In the portions being mutually identical or similar in the respective embodiments, the same reference numbers are added to those portions in the drawings.

First Embodiment

With reference to FIGS. 1 to 8A and 8B, the fuel cell system according to the first embodiment is described hereinafter. FIG. 1 is an overall configuration of the fuel cell system according to the first embodiment. The fuel cell system can be adapted to vehicles, for example, electric vehicles.

As shown in FIG. 1, the fuel cell system of the first embodiment is provided with a fuel cell 1 that generates electric power by electrochemical reaction between hydrogen and oxygen. The fuel cell 1 supplies power to the electrical load (not shown) or electrical equipment such as secondary battery. It is noted that an electric motor as a vehicle power source may correspond to an electrical load when the fuel cell system is adapted to the electric vehicle. The fuel cell 1 and the electrical load are electrically connected via a DC-DC converter 52 (described later).

According to the first embodiment, a solid polymer electrolyte fuel cell as a fuel cell 1 is employed where a plurality of cells 10 of which each unit as a fundamental unit are laminated and are electrically connected in series.

Figure 2:
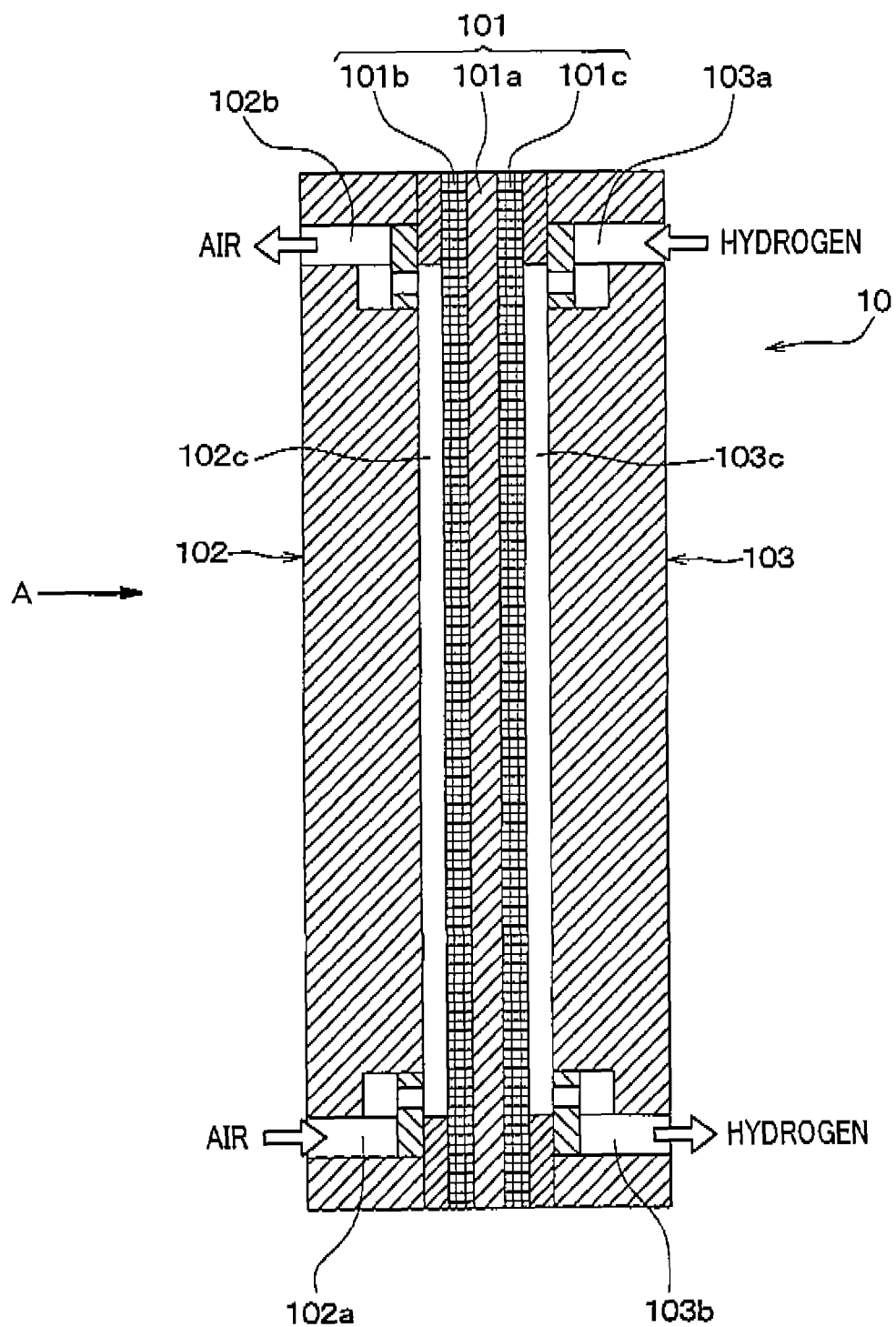
FIG. 2 is an explanatory diagram showing a cross section of the fuel cell according to the first embodiment.

Specifically, as shown in the cross section illustrated in FIG. 2, the cell 10 is composed of a membrane electrode assembly 101 in which a pair of electrodes 101b and 101c disposed at both sides of an electrolyte membrane 101a, each having a catalyst layer and a diffusion layer and, an air-side separator 102 and an hydrogen-side separator 103 which sandwiches the membrane electrode assembly 101.

In the air-side separator 102, an air inlet 102a connected to an air-supply-passage 20a (described later), an air outlet 102b connected to an air-outlet-passage 20b (described later) and an air-flowing-groove 102c that allows the air to flow to the air outlet 102b from the air inlet 102a are formed.

Meanwhile, in the hydrogen-side separator 103, an hydrogen inlet 103a connected to an hydrogen-supply-passage 30a (described later), an hydrogen outlet 103b connected to an hydrogen-outlet-passage 30b (described later) and an hydrogen-flowing-groove 103c that allows the air to flow to the hydrogen-outlet 103b from the hydrogen inlet 103a.

The air-flowing-groove 102c of the air-side separator 102 and the hydrogen-flowing-groove 103c of the hydrogen-side separator 103 are formed such that a direction of the air-flow and a direction of the hydrogen-flow are opposite each other. In the cell 10, water is likely to remain at a region around the air outlet 102b in the air-side separator 102.

In the respective cell 10 composed as described above, the electrical energy can be produced by an electrochemical reaction with a reactant gas i.e., hydrogen and oxygen (as described below) and the electric energy is outputted therefrom.

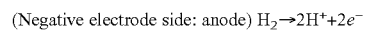

(Negative electrode side: anode) $H_2 \rightarrow 2H^+ + 2e^-$

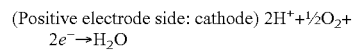

(Positive electrode side: cathode) $2H^+ + \frac{1}{2}O_2 + 2e^- \rightarrow H_2O$ As shown in FIG. 1, in the fuel cell system, a voltage sensor 11 that detects the output voltage of the fuel cell 1 and a current sensor 12 that detects the output current of the fuel cell 1 are disposed.

The DC-DC converter 52 serves as a power control unit capable of transmitting power of the fuel cell 1 and the electrical load. The DC-DC converter 52 according to the first embodiment is constituted such that the output current of the fuel cell 1 is capable of being superposed AC (alternating current) signal having any frequency range. It is noted that the DC-DC converter 52 constitutes signal applying unit.

Figure 10A:
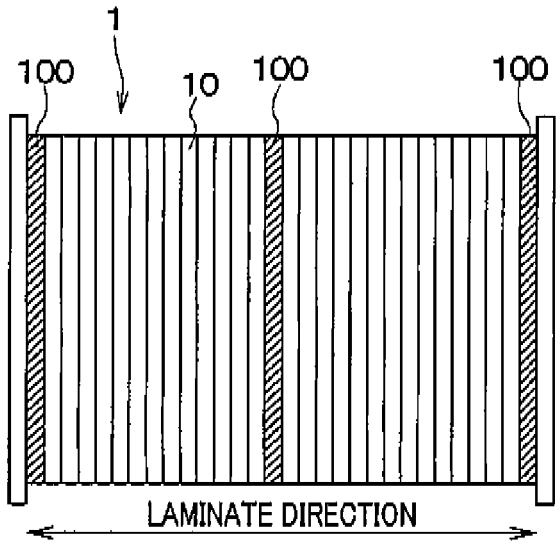
FIGS. 10A and 10B are explanatory diagrams showing a temperature distribution in a direction in which the fuel cells are laminated.

Further, at a central portion of a direction in which fuel cells 1 are laminated (i.e., laminate-direction as shown in FIG. 10A), an impedance measurement portion 100 is disposed. The impedance measurement portion 100 is disposed for measuring impedance at a local portion 10$d$ in a plane of the fuel cell 1 when the DC-DC converter 52 applies an AC signal to the fuel cell 1. The impedance measurement portion 100 according to the first embodiment is constituted as a plate like member. The impedance measurement portion 100 is disposed to be sandwiched by adjacent cells 10 and to be electrically connected to the adjacent cells 10.

Specifically, the impedance measurement portion 100 includes a local current sensor (not shown) that detects current flowing through the local portion 10$d$ in the plane of the fuel cell 1 and a cell voltage sensor (not shown) that detects cell voltage of the fuel cell 1. The detection signals detected by the respective sensors are connected to a signal processing circuit 51 (described later). The local portion 10$d$ where the impedance of the cell 10 is measured is described later.

Also, the fuel cell system is provided with an air passage 20 that supplies air (oxygen) towards a cathode (positive electrode) 101$b$ side of the respective cell 10, an hydrogen passage 30 that supplies hydrogen towards an anode (negative electrode) 101$c$ of the fuel cell 1. As shown in FIG. 1, the upstream side in the air passage 20 with respect to the fuel cell 1 is referred to as an air supply passage 20$a$ and the downstream side in the air passage 20 is called as an air discharge passage 20$b$. Similarly, the upstream side in the hydrogen passage 30 with respect to the fuel cell 1 is called as a hydrogen supply passage 30$a$ and the downstream side in the hydrogen passage 30 is called as a hydrogen discharge passage 30$b$.

In the most upstream side of the air supply passage 20$a$, an air pump 21 that transfers the air acquired from the atmosphere to the fuel cell 1 and a humidifier 22 that humidifies the air is disposed between the air pump 21 and the fuel cell 1. In the air discharge passage 20$b$, an air valve 23 adjusts pressure of the air in the fuel cell 1 is provided.

In the most upstream side of the hydrogen supply passage 30$a$, a high-pressure-hydrogen tank 31 in which hydrogen is filled is disposed. A hydrogen valve 32 that adjusts pressure of the hydrogen being supplied to the fuel cell 1 is disposed between the high-pressure-hydrogen tank 31 and the fuel cell 1 in the hydrogen supply passage 30$a$.

In the hydrogen discharge passage 30$b$, a hydrogen circulation passage 30$c$ that constitutes a closed loop connected to the downstream side of the hydrogen valve 32 in the hydrogen-supply-passage 30$a$ to be branched therefrom is disposed. This configuration allows hydrogen to circulate in the hydrogen passage 30 thereby resupplying unreacted hydrogen to the fuel cell 1. Moreover, in the hydrogen circulation passage 30$c$, a hydrogen pump 33 used for circulating hydrogen in the hydrogen passage 30 is disposed.

To secure the efficiency of the power generation, the temperature of the fuel cell 1 is maintained to be constant (e.g. 80 deg C) during the operation. Therefore, a cooling system that cools the fuel cell 1 is disposed in the fuel cell system. The cooling system includes a cooling water passage 40 that circulates the cooling water (heating medium) in the fuel cell 1, a water pump 41 that circulates the cooling water and a radiator (heat radiation unit) 43 including a fan 42.

In the cooling water passage 40, a bypass passage 44 that allows the cooling water to bypass the radiator 43. In a joint portion where the cooling water passage 40 and the bypass passage 44 are joined, a passage switching valve 45 that adjusts an amount of cooling water flowing through the bypass passage 44. Also, a temperature sensor 46 is disposed around the output side of the fuel cell 1. The temperature sensor 46 serves as temperature detecting means that detects a temperature of the cooling water flowing out from the fuel cell 1. Since the temperature sensor 46 detects the temperature of the cooling water, the temperature of the fuel cell 1 can be detected indirectly.

The fuel cell system is provided with a control unit (i.e., electronic control unit: ECU) 50 that performs various controlling functions. The control unit 50 includes a well-known microcomputer including CPU, ROM and RAM, and its peripheral circuit. The control unit 50 receives detection signals from a voltage sensor 11, a current sensor 12 and a signal processing circuit 51. The control unit 50 generates control signals based on a calculation result and outputs the control signals to the air pump 21, the humidifier 22, the air valve 23, the hydrogen valve 32, the hydrogen pump 33, the water pump 41 and the passage switching valve 45.

The control unit 50 according to the first embodiment controls the air pump 21 and the air valve 23 based on the signal from the signal processing circuit 51 when the operation of the fuel cell 1 is stopped, and executes a gas purge processing in which water present in the gas passage of the reactant gas of the fuel cell 1 flows is discharged therefrom.

According to the first embodiment, the air pump 21 and the air valve 23 correspond to supplying means in which air as a purge gas is supplied to the gas passage of the reactant gas of the fuel cell 1, and a purge module 50$a$ in the control unit, which executes the gas purge processing corresponds to purging means.

The fuel cell system includes the signal processing circuit 51 that processes a signal from the impedance measurement portion 100. The signal processing circuit 51 measures the impedance at the local portion 10$d$ in the cell 10 based on a local current and cell voltage measured by the impedance measurement portion 100 by using well-known alternating current measurement method. The signal processing circuit 51 outputs a measurement result of the impedance at the local portion 10$d$ in the cell 10 to the control unit 50. The impedance measurement portion 100 and the signal processing circuit 51 correspond to measuring means.

Figure 3:
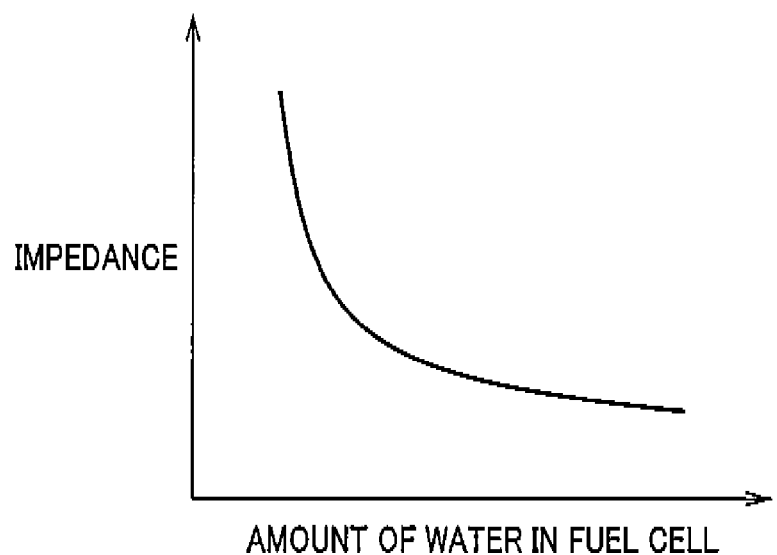
FIG. 3 is a graph showing a relationship between an amount of residual water remained in the fuel cell and the impedance value.

FIG. 3 illustrates an ideal relationship between an amount of water in the fuel cell 1 and the impedance value of the fuel cell 1. As shown in FIG. 3, there is a correlation between an amount of water in the fuel cell 1 and the impedance thereof. In other words, when the amount of water in the fuel cell 1 decreases, the electrolyte membrane 101$a$ becomes dry so that the conductivity of the electrolyte membrane 101$a$ decreases and the resistance (membrane resistance) of the electrolyte membrane 101$a$ increases. As a result, the impedance of the respective cells 10 of the fuel cell 10 increases.

Accordingly, by using the impedance value of the respective cells 10, an amount of water in the respective cells 10 of the fuel cell 1 can be estimated. As a result, when the fuel cell 1 is operated, depending on the estimation of the amount of water in the respective cells 10, various control equipment 21, 22, 23, 32, 33 can be controlled whereby the amount of water in the respective cells 10 can be optimized.

Figure 4:
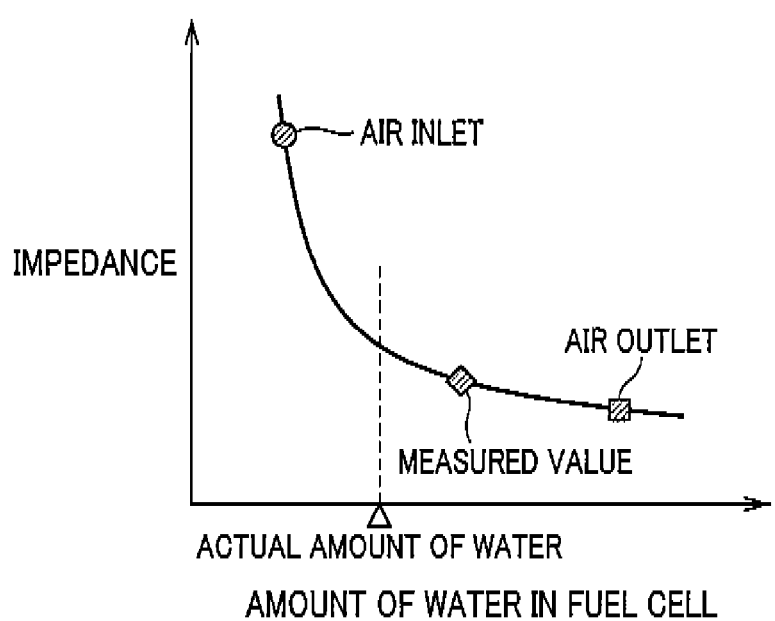
FIG. 4 is an explanatory diagram showing a variance of correlation between an amount of water remained in the fuel cell and the impedance when the gas purge processing is executed.

FIG. 4 is an explanatory diagram showing a variance of correlation between an amount of water remaining in the fuel cell 1 and the impedance when the gas purge processing is executed. When the gas purge processing is executed, there is insufficient water at an air inlet 102$a$ in the respective fuel cells 10 of the fuel cell 1, meanwhile, excessive water remains at the air outlet 102$b$ in the respective fuel cells 10. Accordingly, as shown in FIG. 4, when the gas purge processing is executed, the impedance around the air inlet 102*a* of the respective cells 10 increases and the impedance around the air outlet 102*b* decreases. In this case, since the total impedance of the entire fuel cell 1 is calculated as a sum of the impedance around the air inlet 102*a* of the respective cells 10 and the impedance around the air outlet 102*b*, the correlation between the amount of water in the fuel cell 1 and the impedance thereof is not satisfied. In other word, the measurement result of the impedance is shifted from the actual impedance.

Accordingly, in the first embodiment, to avoid the impedance value being shifted from the actual impedance (to enable the impedance to reflect the amount of water in the fuel cell 1) when the gas purge processing is executed, the impedance at the local portion 10*d* in the cell 10 that is adjacent to the impedance measurement portion 100 is measured.

Figure 5:
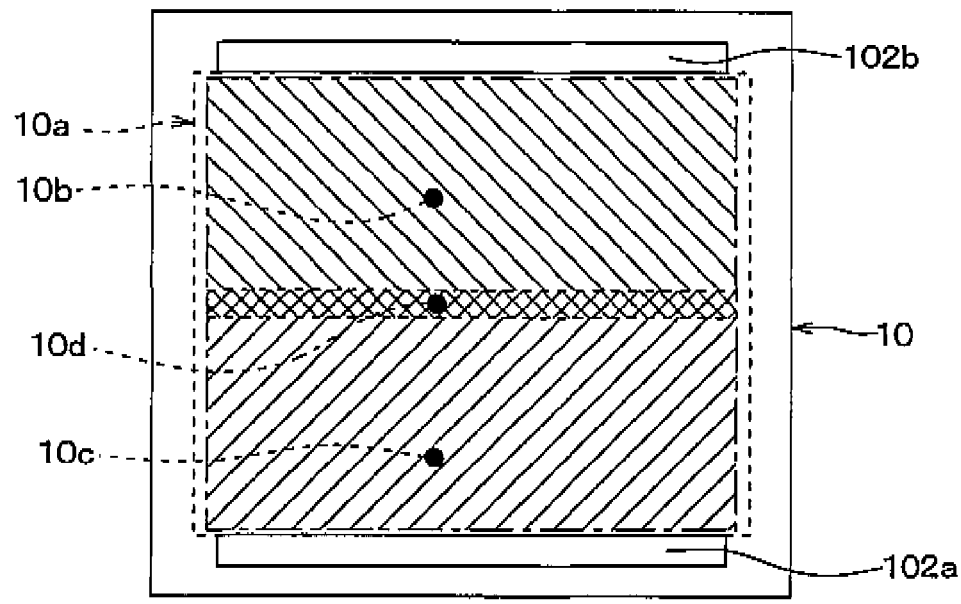
FIG. 5 is a diagram that illustrates a local portion used for measuring impedance of the fuel cell.

FIG. 5 is an explanatory diagram that illustrates a local portion used for measuring impedance of the cell 10. It is noted that FIG. 5 is an arrow view of the cell 10 viewed from A direction in FIG. 2.

As shown in FIG. 5, the impedance is measured in the impedance measurement portion 100 such that the impedance at the local portion 10*d* located at a boundary portion between a wet region 10*b* and a dry region 10*c* arranged in advance at a power generation region 10*a* is measured. It is noted that the local portion 10*d* is not the boundary portion between the wet region 10*b* and the dry region 10*c* itself, but is located at a limited portion in the boundary portion between the wet region 10*b* and the dry region 10*c*.

Figure 6:
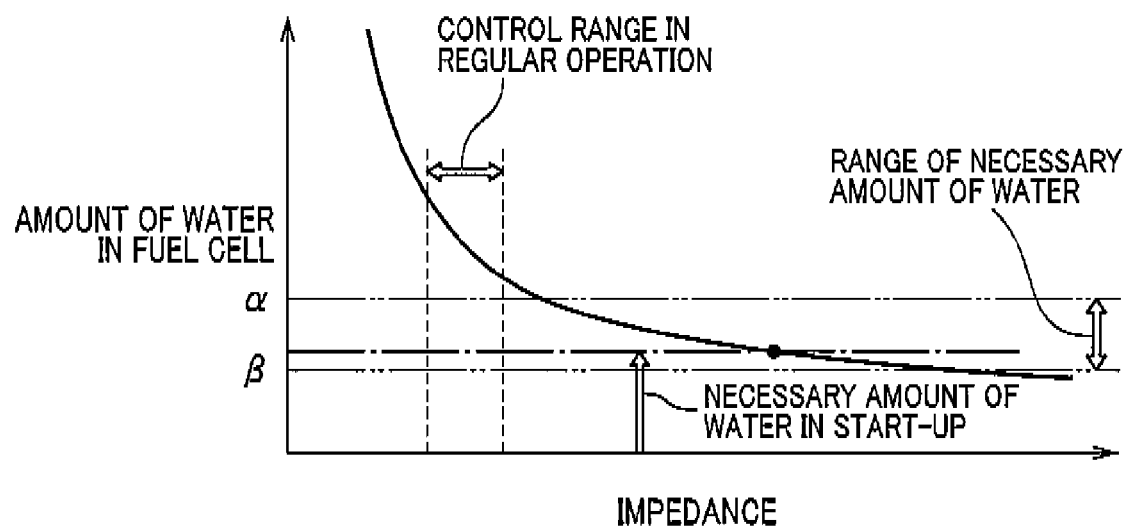
FIG. 6 is a diagram that illustrates a wet region and a dry region located in the power generation region of the fuel cell.

With reference to FIG. 6, the wet region 10*b* and the dry region 10*c* disposed in the power generation region 10*a* of the cell 10 is explained. FIG. 6 is a diagram that illustrates a wet region 10*b* and a dry region 10*c* located in the power generation region 10*a* of the cell 10.

First, gas purge processing is executed so as to control a total amount of water in the fuel cell 1 to be necessary amount of water in the cell 10 to start up the fuel cell 1 as shown in FIG. 6. As shown in FIG. 6, the necessary amount of water of the cell 10 is set such that an amount of water which does not cause a degradation of the start-up characteristics of the fuel cell 1 is set as an upper limit amount and an amount of water which does not cause decreasing of the efficiency in the power generation is set as a lower limit amount (for example, the lower limit is set as ⅓ of the upper limit).

Subsequently, the wet region 10*b* and the dry region 10*c* are set in the power generation region 10*a* depending on a distribution of an amount of water in the cell 10 when the gas purge processing is completed. Specifically, when the gas purge processing is completed, a region where the water in the power generation region 10*a* is larger than or equal to a predetermined amount of water set in advance is set as the wet region 10*b* and a region where the water in the power generation region 10*a* is less than the predetermined amount of water is set as the dry region 10*c*. According to the first embodiment, the wet region 10*b* and the dry region 10*c* are set based on a distribution of an amount of water at the membrane electrode assembly 101 when the gas purge processing is performed to control the total amount of water in the fuel cell 1 to be necessary amount of water when the fuel cell 1 starts to operate.

Hence, at the local portion 10*d* located at the boundary portion between the wet region 10*b* and the dry region 10*c* disposed in the power generation region 10*a* of the cell 10, when the gas purge processing is executed, the impedance at the local portion 10*d* significantly increases when an amount of water reaches approximately the necessary amount of water for the fuel cell 1 being start up.

Accordingly, depending on the impedance value measured at the local portion 10*d* located at the boundary portion between the wet region 10*b* and the dry region 10*c*, a completion timing of the gas purge processing is adjusted whereby a necessary amount of water in the respective cells 10 when the fuel cell 1 starts to operate can be adjusted.

Next, with reference to the flow chart as shown in FIG. 7, the gas purge processing executed by the control unit 50 is described hereinafter. The control routine as shown in FIG. 7 is executed when the fuel cell 1 starts to operate.

As shown in FIG. 7, the control unit 50 executes a regular operation first (S10). In the regular operation, the fuel cell 1 operates with a reactant gas being supplied so as to suppress power loss whereby high efficiency of the power generation can be obtained.

Next, it is determined whether or not the operation of the fuel cell 1 should be terminated (S20). In the processing at step 20, for example, based on whether or not the operation stop command from upper system has been received, it is determined that the fuel cell 1 can be terminated or not.

When it is determined that the fuel cell 1 is not to be terminated at step S20, the regular operation of step 10 continues to operate, and when it is determined that an operation of the fuel cell 1 should be terminated, a gas purge processing is performed so as to discharge the water being present in the gas passage of the reactant gas of the fuel cell 1 (S30).

Subsequently, the impedance at the local portion 10*d* located at the boundary portion between the wet region 10*b* and the dry region 10*c* which are set in advance in the cell 10 is measured while the gas purge processing is executed (S40). In this processing, the DC-DC converter 52 as the signal applying unit applies an AC (alternating current) signal having low frequency (e.g. 10 Hz) which is equal to or lower than a predetermined reference frequency to an output current of the fuel cell 1. Then, the impedance measurement portion 100 detects a local current and a cell voltage at the local portion 10*d* of the cell 10. The signal processing circuit 51 calculates the impedance at the local portion 10*d* of the cell 10 by using the detection signals detected by the impedance measurement portion 100.

Figure 8A:
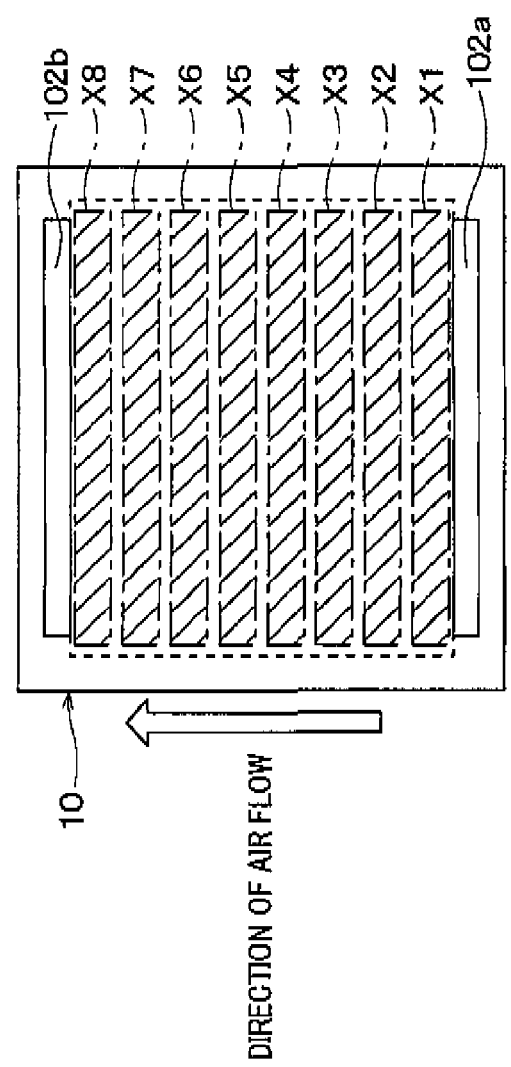
FIGS. 8A and 8B are diagrams that illustrate a change in the impedance at the power generation region of the fuel cell after the gas purge processing is executed.
Figure 8B:
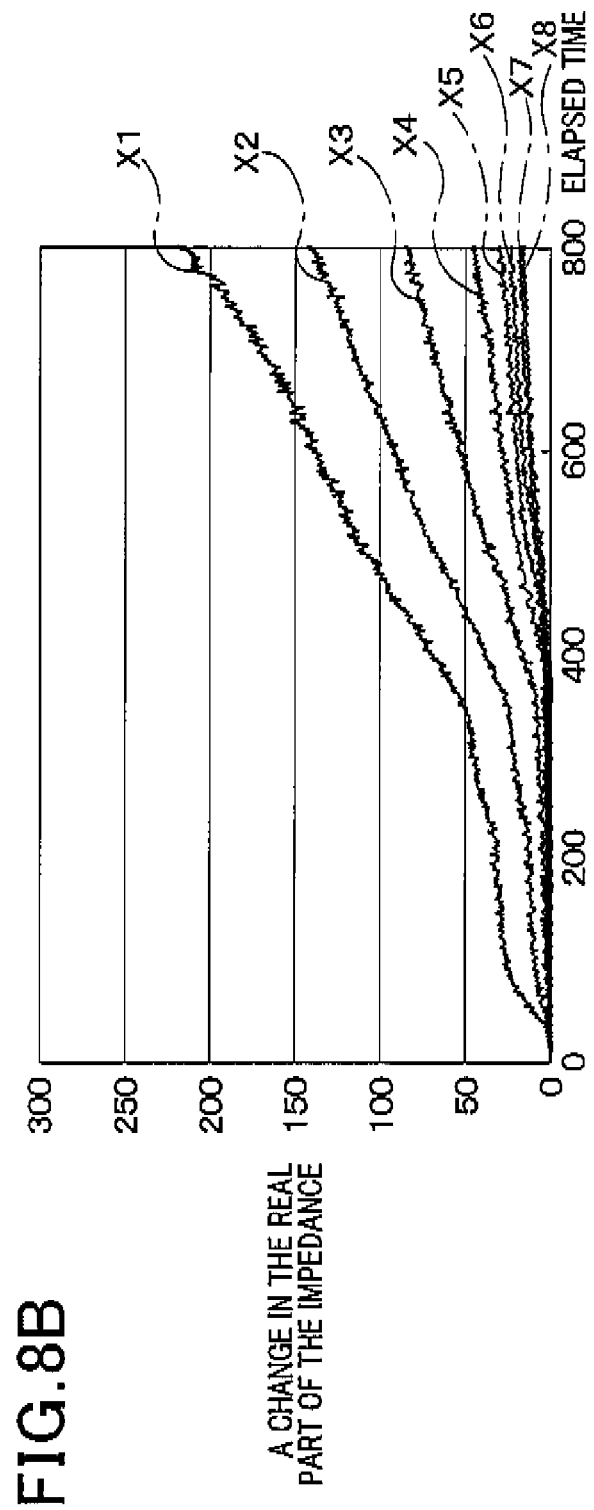

With reference to FIGS. 8A and 8B, hereinafter is described a change in the impedance at the power generation region 10*a* of the cell 10 after the gas purge processing is executed. FIG. 8A is an explanatory diagram showing respective measurement regions for impedance at the power generation region 10*a* of the cell 10. FIG. 86 is a graph showing a change in a real part of the impedance at the respective measurement portions arranged in the cell 10 after the gas purge processing is executed.

According to the first embodiment, as shown in FIG. 8A, eight measurement portions X1 to X8 are disposed between the air inlet 102*a* and an air outlet 102*b* to be in parallel in the power generation region 10*a* of the cell 10 and, a change in the real part of the impedance at the measurement portions X1 to X8 is measured after the gas purge processing is executed.

As a result, after the gas purge processing is executed, a change in the real part of the impedance at the measurement portion X1 that locates most closely to the air inlet 102*a* becomes large and the closer to the air outlet 102*b*, the smaller a change in the real part of the impedance.

Subsequently, at S50, it is determined whether or not the gas purge processing should be terminated by using the impedance at the local portion 10*d* of the cell 10. Specifically, it is determined whether or not the impedance at the local portion 10*d* of the cell 10 which is calculated at the step S40 is larger than a predetermined reference threshold value set in advance, thereby determining a termination of the gas purge processing. The predetermined reference threshold value is set to be an impedance value at the local portion 10d corresponding to a necessary amount of water for the fuel cell 1 when the fuel cell 1 is in start-up process.

When it is determined that the impedance value at the local portion 10d is less than or equal to the reference value at step S50, the process returns to step S30 and continues to execute the gas purge processing and, when it is determined that the impedance value at the local portion 10d is larger than the reference value, the process terminates the gas purge processing.

When the gas purge processing is terminated, residual water being localized in the fuel cell 1 is spread out throughout the fuel cell 1 depending on the elapsed time. Therefore, a state of water in the fuel cell 1 can be appropriate state when the fuel cell 1 is in subsequent start-up process.

In the above-described embodiment, the impedance at the local portion 10d of the cell 10 is measured so that a variance of correlation between the measured impedance and an amount of water at the local portion 10d in the cell 10 can be suppressed. Hence, a state of the local portion 10d of cell 10, i.e., wet state or dry state can be appropriately determined.

Moreover, since the local portion 10d disposed between the wet region 10b and the dry region 10c in the fuel cell 10 becomes dry and the gas purge processing is terminated when the impedance at the local portion 10d increases, the total amount of water in the fuel cell 1 when the gas purge processing is terminated can be adjusted to a necessary amount of water for the fuel cell 1.

As a result, in the fuel cell system according to the present disclosure, the gas purge processing can be performed to adjust the cell 10 that constitutes the fuel cell 1 to have an appropriate amount of water.

According to the first embodiment, the wet region 10b and the dry region 10c are set depending on a distribution of amount of water at the membrane electrode assembly 101 when the gas purge processing is executed in advance. Thus, depending on the distribution of the amount of water including not only an amount of water in the electrolyte membrane 101a but also an amount of water in the respective electrodes 101b, the wet region 10b and the dry region 10c are set, whereby a variance between the total amount of water in the fuel cell 1 when the gas purge processing is completed and necessary amount of water for the fuel cell 1 when the fuel cell 1 is in stark-up can be suppressed.

Moreover, according to the first embodiment, the DC-DC converter 52 as a signal applying unit is configured to measure the impedance at the local portion 10d of the cell 10 when a low frequency AC signal is applied to the output current of the fuel cell 1.

As a result, a change of an amount of water in the diffusion layers of the respective electrodes 101b and 101c can be estimated so that a change in the impedance of the cell 10 can be measured earlier. Therefore, the gas purge processing can be terminated at appropriate timing. It is noted that an amount of water in the diffusion layers of the respective electrodes 101b and 101c tend to change faster than that of the electrolyte membrane 101a when the gas purge processing is executed.

Second Embodiment

Next, the second embodiment is described hereinafter. In the above-described first embodiment, it is determined that whether or not the gas purge processing should be terminated by using the predetermined reference threshold value (S50). However, in the second embodiment, the reference threshold value is changed based on the temperature of the fuel cell 1.

Figure 9:
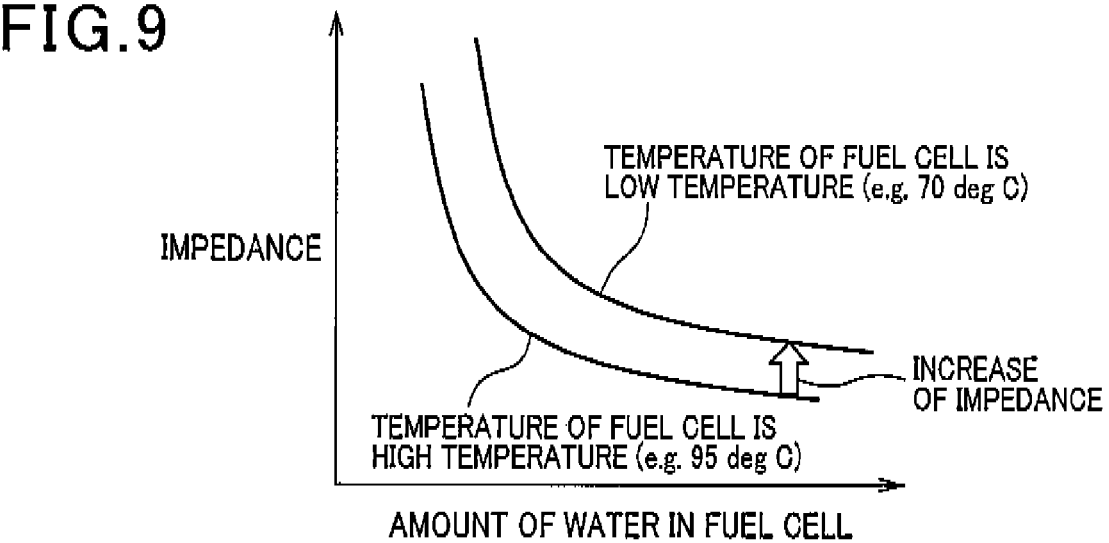
FIG. 9 is a diagram showing a relationship between an amount of residual water in the fuel cell and the impedance value depending on the temperature of the fuel cell.

FIG. 9 is a diagram showing a relationship between an amount of residual water in the fuel cell 1 and the impedance value depending on the temperature of the fuel cell 1. As shown in FIG. 9, even when the amount of water in the fuel cell 1 is not changed, the impedance value of the fuel cell 1 tends to increase as the temperature of the fuel cell 1 decreases according to the Arrhenius's law.

Therefore, the gas purge processing according to the second embodiment, the lower the temperature of the fuel cell 1, the larger the reference threshold value. Specifically, a control table which determines a relationship between the temperature of the fuel cell 1 and the reference threshold value is stored in the RAM (random access memory) of the control unit 50 and, the reference threshold value is determined by using the detected value of the temperature sensor 46 and the control table while the gas purge processing is executed.

According to the second embodiment, the gas purge processing can be terminated appropriately by changing the reference threshold value to be larger as the temperature of the fuel cell decreases.

Other Embodiments

The present disclosure is not limited to the above-described embodiments. However, various modifications can be made within the spirit of the present disclosure as followings.

(1) As described in the above-described embodiments, it is preferable to measure the impedance at the local portion 10d of the cell 10 when the DC-DC converter 52 applies the low frequency AC signal to the output current of the fuel cell 1. However, it is not limited to this configuration. For example, a high frequency AC signal or a mixed AC signal having a high frequency signal and low frequency signal may be applied to the output current of the fuel cell 1, and the impedance at the local portion 10d of the cell 10 may be measured.

According to the above-described embodiments, a configuration in which an AC signal is applied to the output current of the fuel cell 1 by the DC-DC converter 52 is employed. However, it is not limited to this configuration. For example, an oscillator can be used for applying an AC signal to the output current of the fuel cell 1 in the configuration.

(2) According to the above-described embodiments, it is preferable to set the wet region 10b and the dry region 10c depending on a distribution of an amount of water in the membrane electrode assembly 101 when the gas purge processing is executed in advance. However, it is not limited to the above-described configuration. For example, depending on a distribution of an amount of water in the electrolyte membrane 101a when the gas purge processing is executed in advance, the wet region 10b and the dry region 10c can be set.

Figure 10B:
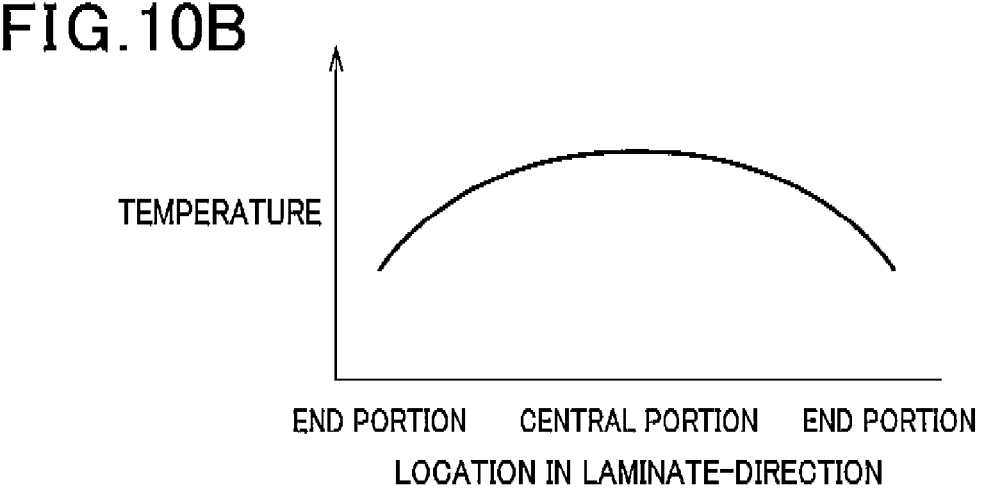

(3) In the above-described embodiments, an example that the impedance measurement portion 100 is disposed at the central portion in the laminate-direction of the fuel cell 1 is described. However, it is not limited to this configuration, for example, as shown in FIG. 10B, since the temperature at the center portion and the temperature at the end portion in the fuel cell 1 differ, the impedance measurement portion 100 can be disposed at an end portion side of the laminate-direction of the fuel cell 1 and a portion other than the end portion side (preferably center portion) as shown in FIG. 10A, and it is determined whether or not the gas purge processing should be terminated by using an average value of the respective measurement values. Thus, the impedance is measured at different portions having different temperature range i.e., an end portion side in the laminate-direction of the fuel cell 1 and a portion other than the end portion side, whereby a variance between the total amount of water in the fuel cell 1 when the gas purge processing is executed and necessary amount of water for the entire fuel cell 1 can be suppressed. It is noted that FIGS. 10A and 10B are explanatory diagrams showing a temperature distribution in a direction in which the fuel cells are laminated.

(4) According to the above-described embodiments, the fuel cell system of the present disclosure which is adapted to the electric vehicle is described. However, it is not limited to electric vehicles, for example, the fuel cell system of the present disclosure can be adapted to movable bodies such as a vessel or a portable power generator and a stationary power generator.

What is claimed is:

1. A fuel cell system comprising:
a fuel cell including a plurality of cells being laminated in a laminate direction of the fuel cell, each of the cell producing electrical energy by an electrochemical reaction with a reactant gas;
signal applying unit for applying an AC signal having a predetermined frequency to the fuel cell;
measuring means for measuring an impedance of the cell when the signal applying unit applies the AC signal to the fuel cell;
supplying means for supplying a purge gas to a gas passage where the reactant gas flows; and
purging means for purging the gas passage so as to discharge water present in the gas passage when an operation of the fuel cell is stopped, the purging being executed by controlling the supplying means based on the impedance of the cell measured by the measuring means,
wherein
the cell includes a wet region and a dry region which are set depending on a distribution of an amount of water in the cell when the purging is executed so as to set a total amount of water in the fuel cell to be necessary amount of water to start up the fuel cell;
the measuring means is configured to measure the impedance at a local portion located at a boundary portion between the wet region and the dry region in the cell; and
the purging means is configured to terminate the purging when the impedance measured by the measuring means is larger than a predetermined reference threshold value.

2. The fuel cell system according to claim 1, wherein the cell includes an electrolyte membrane and a membrane electrode assembly in which a pair of electrodes and are disposed at both sides of the electrolyte membrane, the wet region and the dry region are set depending on a distribution of an amount of water in the membrane electrode assembly when the purging is executed so as to set a total amount of water in the fuel cell to be necessary amount of water to start up the fuel cell.

3. The fuel cell system according to claim 1, wherein the purging means is configured to set the reference threshold value such that the lower the temperature of the fuel cell, the larger the reference threshold value.

4. The fuel cell system according to claim 2, wherein the purging means is configured to set the reference threshold value such that the lower the temperature of the fuel cell, the larger the reference threshold value.

5. The fuel cell system according to claim 1, wherein the measuring means is configured to measure the impedance such that among the plurality of the cells, an impedance of at least the cell located at an end portion side of the laminate direction and the cell located at a location other than the end portion side of the laminate direction are measured.

6. The fuel cell system according to claim 2, wherein the measuring means is configured to measure the impedance such that among the plurality of the cell, an impedance of at least the cell located at an end portion side of the laminate direction and the cell located at a location other than the end portion side of the laminate direction are measured.

7. The fuel cell system according to claim 3, wherein the measuring means is configured to measure the impedance such that among the plurality of the cell, an impedance of at least the cell located at an end portion side of the laminate direction and the cell located at a location other than the end portion side of the laminate direction are measured.

8. The fuel cell system according to claim 1, wherein the signal applying unit is capable of applying an AC signal which is lower than or equal to a predetermined reference frequency, and the measuring means is configured to measure the impedance of the cell when the signal applying means applies the AC signal to the fuel cell.

9. The fuel cell system according to claim 2, wherein the signal applying unit is capable of applying an AC signal which is lower than or equal to a predetermined reference frequency, and the measuring means is configured to measure the impedance of the cell when the signal applying means applies the AC signal to the fuel cell.

10. The fuel cell system according to claim 3, wherein the signal applying unit is capable of applying an AC signal which is lower than or equal to a predetermined reference frequency, and the measuring means is configured to measure the impedance of the cell when the signal applying means applies the AC signal to the fuel cell.

11. The fuel cell system according to claim 5, wherein the signal applying unit is capable of applying an AC signal which is lower than or equal to a predetermined reference frequency, and the measuring means is configured to measure the impedance of the cell when the signal applying means applies the AC signal to the fuel cell.

* * * * *